April 14, 1925.
M. D. CAMPBELL ET AL
1,533,970
COVERING FOR TIRES
Filed March 15, 1923
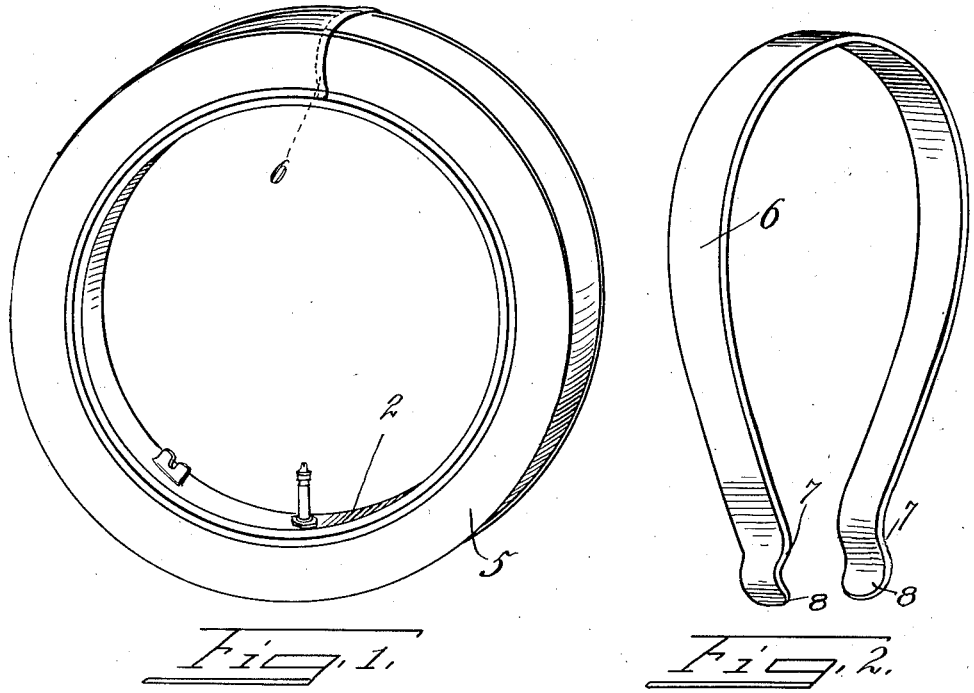
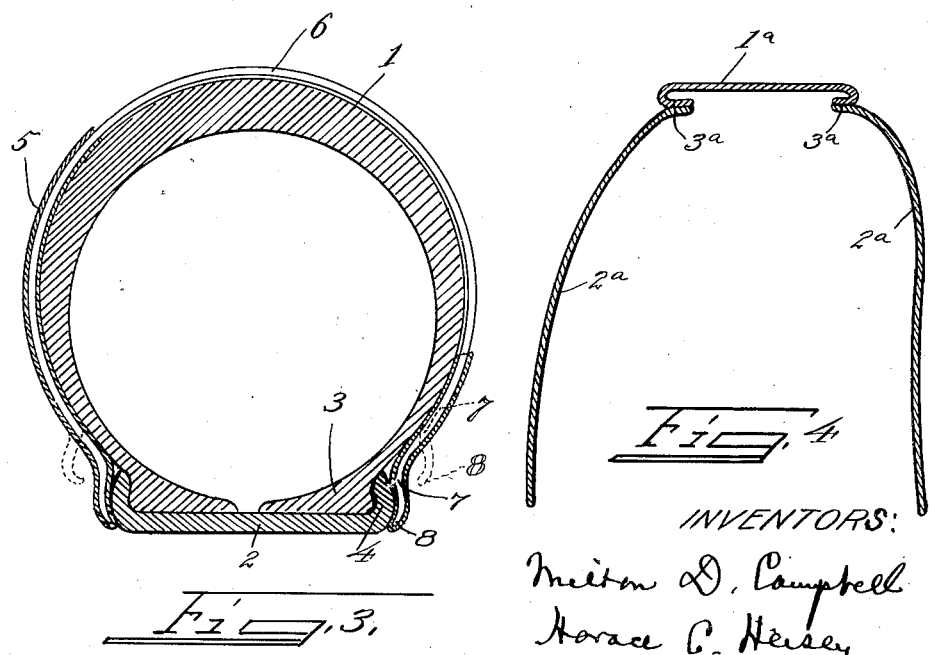
INVENTORS:
Milton D. Campbell
Horace C. Hersey
BY
ATTORNEYS.

Patented Apr. 14, 1925.

1,533,970

UNITED STATES PATENT OFFICE.

MILTON D. CAMPBELL AND HORACE C. HEISEY, OF CINCINNATI, OHIO, ASSIGNORS TO THE PERKINS-CAMPBELL COMPANY, OF CINCINNATI, OHIO, A CORPORATION OF OHIO.

COVERING FOR TIRES.

Application filed March 15, 1923. Serial No. 625,254.

*To all whom it may concern:*

Be it known that we, MILTON D. CAMPBELL and HORACE C. HEISEY, citizens of the United States, and residents of Cincinnati, in the county of Hamilton and State of Ohio, have invented certain new and useful Improvements in Coverings for Tires, of which the following is a full, clear, and exact description, reference being had to the accompanying drawing, forming part of this specification.

Our invention relates to devices for covering spare tires in automobiles, and known generally as tire covers. It also consists essentially in an improvement in the ordinary style of cover, which is a wrapper of waterproof nature which is laid around the periphery of the tire, and snapped or tied in place, leaving the rim on which the tire is mounted exposed.

The simple tire cover just noted, has one serious defect, namely, that it is hard to get onto the tire quickly, and unless carefully fastened it will not stay on properly. The time when a tire cover becomes an inconvenience is when the spare tire is required, and a tire which has become deflated must be placed on the tire rack. The driver of the car must place the cover on the tire, and an inconvenient cover will not be used.

Tire manufacturers now regularly furnish with spare tires, a cover, which is placed on the tire by the dealer, and serves as an advertisement of the tire. The convenience of manipulation of the cover adds greatly to its value in the hands of the dealer, as a time saver.

It is thus our object to provide a simple peripheral wrapper for pneumatic tires, which can be quickly set in place, and secured about the tire. It is also our object to provide a device which can be as quickly and easily removed, as it is set in place, without tending to drag on the rubber of the tire in so doing. Among other things our device is arranged so that it engages the tire by a clamp which holds it in place so that in wrapping up the tire the starting end does not come off. The clamping in place also gives a universal fit for the cover as will be noted.

We accomplish our object by that certain construction and arrangement of parts to be hereinafter more specifically pointed out and claimed.

In the drawings:

Figure 1 is a perspective view of a tire with our cover in place thereon.

Figure 2 is a perspective view of the clamping spring.

Figure 3 is a section taken across a tire showing the cover in place thereon.

Figure 4 is a section of the cover itself.

We have shown a pneumatic tire 1, mounted on a metal rim 2, of usual construction. The bead 3 of the tire is caught or clinched within the curved edges 4 of the rim.

The tire cover is formed of a piece of treated fabric 5, of some desired construction, and composition, usually being waterproofed or rubberized on the outer side.

Into the ends of the cover fabric, which will be long enough to more than surround the entire periphery of the tire, or into only one end thereof, is sewed a metal clip, similar in function to the clip used to secure the trouser legs against being caught by the pedals and chain of a bicycle.

This clip has the portion 6, which fits over the casing of the tire, and at the ends is formed with an outward bend 7, and return bend 8.

The bends 7 and 8 are formed so that the ends of the clip will lie over and engage the incurved or clinching edge of the tire rim.

If the clip terminated at 7, it would hardly be practical for our purposes, since while it would clamp over the tire, it would not be possible to pull it off, because the tips of the clip would imbed themselves in the rubber facing of the casing.

As formed (Fig. 3), the act of starting the clipped end off of the tire, results in drawing the tips of the clamp over the edge of the rim, and by that time the bends at 7 will have moved to high enough a point to cause the tips 8 to entirely miss the incurving portion of the casing. Thus all that engages the casing is the curved portion 7 which will not bite into the rubber facing.

It is not necessary to sew in the clip, as it might be riveted in place, and as noted, there may be clips in both ends of the piece.

In mounting the cover, the operator first places the clipped end of the cover over the tire, thereby centering the piece and also arranging it so that it is securely attached to the tire. He then rolls the tire in his hands or along the ground, and the cover will wrap around the tire in just the proper way.

The preferred form of cover is made with the top strip 1ª and two side strips 2ª, 2ª, which side strips are fashioned to take a curve, and come in around the belly of the tire. When started correctly, a cover of this construction will naturally roll onto the tire in just the correct manner. As shown the top piece is stitched to the side pieces by hems 3ª.

In securing the cover in place, when wrapped around the tire, either the end which was first secured or clipped down is lifted and the excess of the cover inserted under it, or else the two ends of the cover may be provided with clips, and the free end is merely brought around the tire until it fits smoothly and is then clipped down.

In either case it is evident that the cover will fit a fairly wide range of tire, so far as periphery of the tire is concerned, and that it will be best practice to make the covers to fit casing periphery. Thus for all casings which have a four and one half inch diameter and range in tire diameter from thirty three to thirty six inches, one style of cover can be used, which will be quite a bit too long for the thirty three tire, and will just fit the cross sectional periphery of each casing accurately.

It may be noted that by our cover, we provide a simple structure, having a range of adjustability to various sizes, within practical limits, and being quickly and easily mounted over the tire.

Having thus described our invention, what we claim as new and desire to secure by Letters Patent is:

A tire cover comprising a linear piece of flexible material adapted to fit the cross sectional periphery of the tire casing, and to be wrapped lengthwise about the periphery of the tire, said cover having a clip shaped to engage over the casing, and secured at, at least, one end of the cover said end of the cover adapted to overlap the other end of the cover, for the purpose described, said clip being formed with tips which are curved outwardly from the body of the clip to engage the tire rim edge, with said tips so formed that when withdrawn from the edge of the rim, the ends thereof will not bite into the tire casing.

MILTON D. CAMPBELL.
HORACE C. HEISEY.